United States Patent [19]

Hanyu et al.

[11] 4,266,493
[45] May 12, 1981

[54] ELECTRONIC PATTERN STITCHING SEWING MACHINE

[75] Inventors: Susumu Hanyu; Yoshinobu Tonomura, both of Hachioji, Japan

[73] Assignee: Janome Sewing Machine Co., Ltd., Tokyo, Japan

[21] Appl. No.: 55,307

[22] Filed: Jul. 6, 1979

[30] Foreign Application Priority Data

Jul. 7, 1978 [JP] Japan .................................. 53-81997

[51] Int. Cl.³ .............................................. D05B 3/02
[52] U.S. Cl. ................................................. 112/158 E
[58] Field of Search ........... 112/158 E, 158 R, 158 A, 112/158 D, 158 B, 121.11, 121.12

[56] References Cited

U.S. PATENT DOCUMENTS 4,122,786 10/1978 Tanimoto et al. ............... 112/158 E
4,142,473 3/1979 Itoh ................................. 112/158 E
4,154,178 5/1979 Brown et al. .................... 112/158 E Primary Examiner—Peter P. Nerbun
Attorney, Agent, or Firm—Michael J. Striker

[57] ABSTRACT

An electronic pattern stitching sewing machine has an arrangement for producing signals directing it to stitch a selectable number of patterns in series. These signals are then used to identify the last needle position coordinate of a preceding stitched pattern of the series and the initial needle position coordinate of the next-following pattern to be stitched in the series and, in dependence upon this, the most appropriate interconnecting pattern from a memorized group of such interconnected patterns is selected and stitched, so as to interconnect the preceding stitched pattern and the next-following pattern of the series.

4 Claims, 11 Drawing Figures

① Pattern selection

② Functional selection

③ Comparison between the last stitch coordinate of first pattern, and the initial stitch coordinate of the following pattern ④ Identical ⑤ Sequential outputs of first pattern and the following pattern ⑥ Selection of interconnecting pattern ⑦ The last stitch coordinate and the initial stitch coordinate are replaced into the predetermined formula and calculated by accumulator ⑧ Sequential outputs of first pattern interconnecting pattern and the following pattern

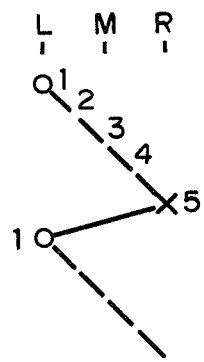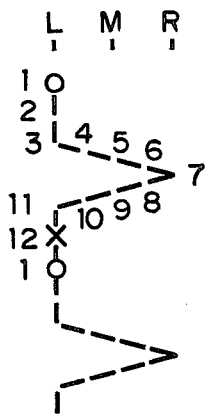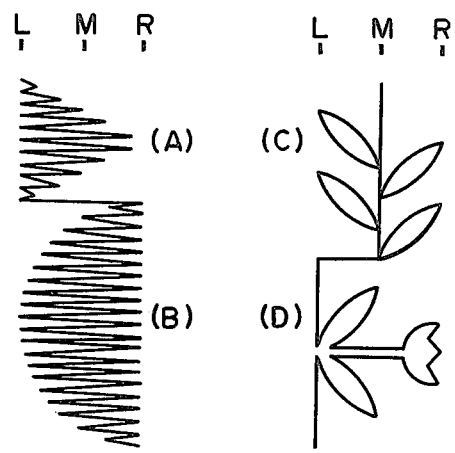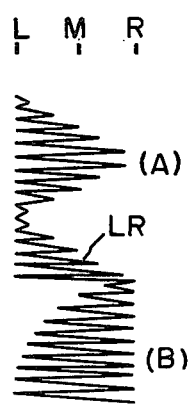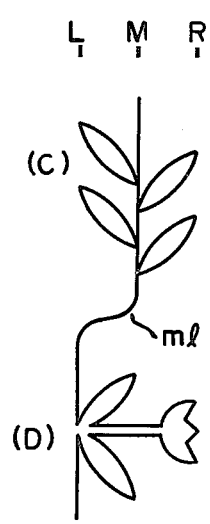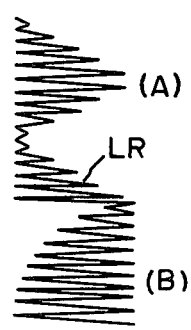

Fig_5
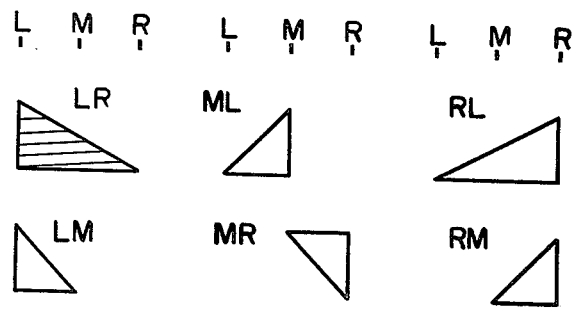
Fig_7
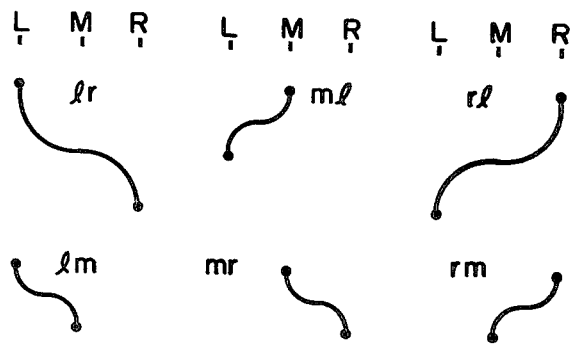
Fig_8
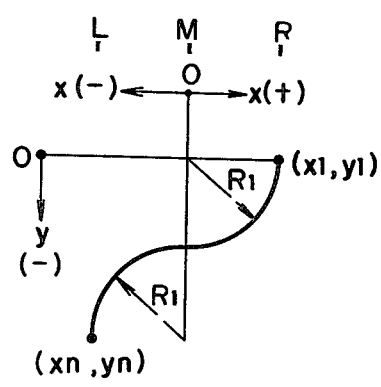
Fig_9
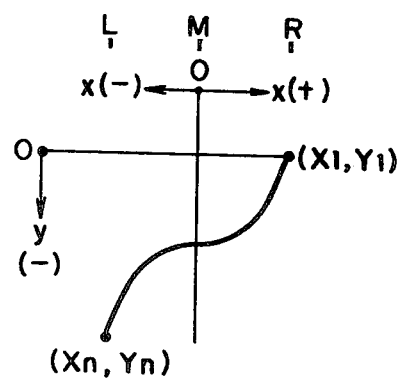

Fig_10    Fig_11

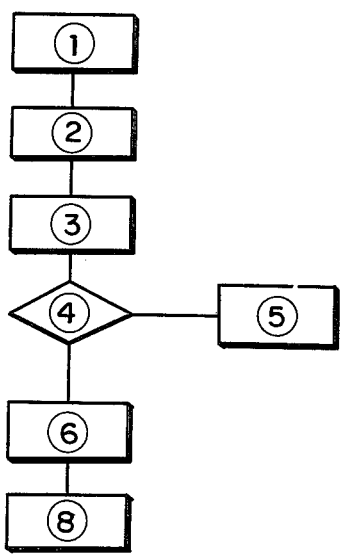
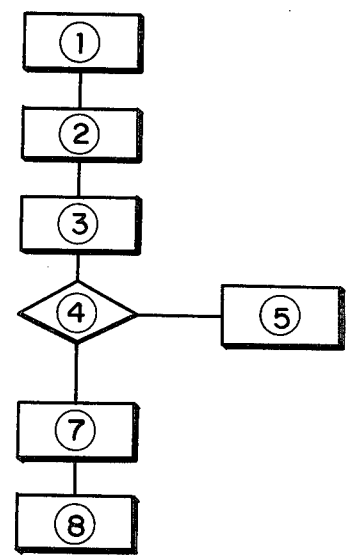

① Pattern selection

② Functional selection

③ Comparison between the last stitch coordinate of first pattern and the initial stitch coordinate of the following pattern ④ Identical ⑤ Sequential outputs of first pattern and the following pattern ⑥ Selection of interconnecting pattern ⑦ The last stitch coordinate and the initial stitch coordinate are replaced into the predetermined formula and calculated by accumulator ⑧ Sequential outputs of first pattern interconnecting pattern and the following pattern

ELECTRONIC PATTERN STITCHING SEWING MACHINE

BACKGROUND OF THE INVENTION

The invention relates to an electronic pattern stitching sewing machine, and more particularly it relates to a system in such a sewing machine to improve the appearance of seams in the different patterns which are stitched in series. This kind of sewing machine can memorize, by manipulation of pattern selecting switches, a number of different patterns to be stitched in combination or in series. In this case, the interconnecting stitch between the two different patterns is problematical. The invention is intended to solve this problem, and to improve the interconnecting stitch in accordance with the different patterns.

Generally the pattern sewing machine is preset to have the same needle position coordinate at the initial and last stitch of a pattern. This is because the pattern such as shown in FIG. 1 by way of example is not suitable. This pattern starts from the initial stitch 1 and terminates at the last stitch 5. In other words, this pattern starts from the needle position coordinate L and terminates at the needle position coordinate R. If such a pattern is stitched in series, the interconnecting stitch between the two patterns necessarily becomes large and deforms the appearance of the combined pattern. If a pattern starts and terminates at the same needle position coordinate as shown in FIG. 2, the interconnection between the two patterns becomes natural, and the combined pattern is never deformed by the interconnecting stitch.

With the recent development of an electronic sewing machine, it has become possible to stitch a number of different patterns in series, any of which are sometimes selectively inverted. Such combinations of different patterns are shown in FIG. 3 in which the pattern A starts and terminate at the same needle position coordinate L, the pattern B starts and terminates at the needle position coordinate R, the pattern C starts and terminates at the needle position coordinate M, and the pattern D is inverted. If such different patterns are directly connected by the interconnecting stitch as shown in FIG. 3, such as interconnecting stitch is unnatural and considerably deforms the combined pattern.

The present invention has been provided to eliminate such defects and disadvantages of the prior art. It is a primary object of the invention to automatically modify the interconnecting stitch between two different patterns to be stitched in series in accordance to the type of patterns.

It is another object of the invention to eliminate the unsmoothness of the interconnecting stitch between the different patterns to produce pretty stitches.

The other features and advantages of the invention will be apparent from the following description of the invention in reference to the preferred embodiments as shown in the attached drawings.

BRIEF DESCRIPTION OF THE DRAWINGS

FIGS. 1 and 2 are explanatory views of basic pattern stitches,

FIG. 3 shows examples of the interconnecting stitches formed between two different patterns of the prior art FIGS. 4 and 6 show examples of the interconnecting stitches formed between two different patterns of the present invention, FIGS. 5 and 7 also show examples of the interconnecting stitches formed between two different patterns of the invention, FIGS. 8 and 9 are explanatory views of calculating formulas for forming the interconnecting stitches between two different patterns in accordance with the invention, and FIGS. 10 and 11 are flow charts for forming the interconnecting stitches as shown in FIGS. 4 and 6, respectively.

DETAILED DESCRIPTION OF THE INVENTION

This invention will be explained with reference to the attached drawings. As shown in FIG. 3, the patterns A and B are interconnected in the conventional way by a single zigzag stitch traversing the entire needle swinging range L-M. Such a single interconnecting stitch may be replaced by a pattern LR as shown in FIG. 4 for the purpose of improving the appearance of the combined patterns. Namely, the preparing six kinds of the patterns as shown in FIG. 5, a stitch pattern, if it is terminated at a needle position, left L, center M or right R, can be shifted to any of the three needle positions at the end of the pattern. It is needless to say that such interconnecting stitches may be eliminated if a following pattern is initiated from the same needle position coordinate as the preceding pattern.

In FIG. 5, the letter mark LR, for example, shows that the preceding pattern terminates at a needle position coordinate L and the following pattern is initiated at the needle position coordinate R. When the pattern C and D in FIG. 3 are interconnected a natural connection will be made by interposing a pattern (ml) which is a combination of two arc stitches as shown in FIG. 6. This is attained by preparing six kinds of patterns as shown in FIG. 7. The small letter marks lr, ml, rl, etc., in FIG. 7 show the same relations of two interconnected patterns as represented by the capital letters in FIG. 5. FIG. 8 shows an explanatory view for forming the interconnecting patterns in FIG. 7 by calculation. The letter x shows the needle swinging amplitude x. The needle position M is $x=0$, the right side thereof is ($+$) and the left side is ($-$), and the cloth feeding amount is y. The initial needle position coordinate after the end of the preceding pattern is $x=x_1$, $y=y_1=0$, and the last needle position coordinate of the interconnecting pattern is $x=x_n$, $y=y_n$ which corresponds to the initial needle position coordinate of a following stitch pattern and the amount of progressing downwardly in the y direction is ($-$). Thus, FIG. 8 shows a stitching locus formed by advancing the respective needle position coordinates $(x_1, y_1), \ldots (x_n, y_n)$ which are obtained by the under-mentioned calculation formulas. The calculation formulas are of a combination of two quadrants with a radius ($R_1$), and the provisos provide for the conditions respectively on the ranges of the quadrants represented by the two calculation formulas.

When the condition is $x_1 > x_n$, that is, when the stitching locus starts from the upper right to the lower left, the needle position coordinates are calculated by the following formulas;

$$(x - \frac{x_1 + x_n}{2})^2 + y^2 = (\frac{x_1 - x_n}{2})^2,$$

in which the proviso is $x - \frac{x_1 + x_n}{2} \geq 0, y \leq 0$ $$(x - \frac{x_1 + x_n}{2})^2 + (y + x_1 - x_n)^2 = (\frac{x_1 - x_n}{2})^2,$$

in which the proviso is $$x - \frac{x_1 + x_n}{2} < 0, y + x_1 - x_n > 0,$$

When the condition is $x_1 < x_n$, that is, when the stitching locus starts from the upper left to the lower right, the needle position coordinates are calculated by the following formulas:

$$(x - \frac{x_1 + x_n}{2})^2 + y^2 = (\frac{x_1 - x_n}{2})^2,$$

in which the proviso is $x - \frac{x_1 + x_n}{2} \leq 0, y \geq 0$ $$(x - \frac{x_1 + x_n}{2})^2 + (y + x_n - x_1)^2 = (\frac{x_1 - x_n}{2})^2,$$

in which the proviso is $$x - \frac{x_1 + x_n}{2} > 0, y + x_n - x_1 > 0,$$

The above mentioned calculations are based on the functions of a combination of circular arcs of the same radius. For the same purpose, it is possible to form an interconnection pattern by the cubic curve of the cubic root as shown in FIG. 9, and the needle position coordinates can be sought by the calculation formula such as $$\frac{|X_1 - X_n|}{X_1 - X_n}(x - \frac{X_1 + X_n}{2})^3 = (y + \frac{|X_1 - X_n|}{2})(\frac{X_1 - X_n}{2})^2$$

In this calculation, when the condition is $X_1 > X_n$, the stitching locus starts from the upper right side to the lower left. When the condition is $X_1 < X_n$, it starts from the upper left to the lower right. The terms other than y at the right side of the formula are the correcting terms due to the fact that the coordinate origin has been determined as shown and a specific range is used in the vicinity of the inflection point of the cubic curve.

FIGS. 10 and 11 are flow charts for controlling the interconnecting stitches between the two different patterns. FIG. 10 is the case using previously memorized interconnecting stitches or patterns. In FIG. 10, a plurality of different patterns are memorized (called the first, the second . . . .) in sequence as a functional selection by pattern selecting switches (not shown) arranged on a front part of the sewing machine and by memory ordering stitches (not shown) operated in association with said pattern selecting switches. Then a micro-computer (not shown) installed within the sewing machine, reads this effect and discriminates if the last needle position coordinate of a preceding pattern and the initial needle position coordinate of the following pattern are same or not. If both are the same, it is ordered that an interconnecting pattern is not interposed between the two adjacent patterns. If both are diffferent, the interconnecting patterns as shown in FIG. 5 which are previously memorized, are prepared. In this case, one of the interconnecting patterns shown in FIG. 5 is selected, in dependence upon the kind of selected patterns and the last needle position coordinate of the precedingly sewn pattern and the initial needle position coordinate of the following pattern, and then an order is given to stitch the first pattern, the selected interconnecting pattern and the second pattern in such a sequence. FIG. 11 shows an embodiment requiring a calculation. In this case the calculating formulas corresponding to the ones as above mentioned regarding the patterns shown in FIGS. 8 and 9 are selected in dependence upon the kinds of the patterns to be stitched. Based on the last needle position coordinate of the preceding pattern and the initial needle position coordinate of the following pattern, the calculating logic unit of the micro-computer calculates out the needle position coordinates of the interconnecting pattern by means of the calculation formulas such as above mentioned. Then the order is given to stitch the first pattern, the calculated interconnecting pattern and the second pattern in such a sequence.

The above mentioned explanation is for the embodiment in which a plurality of different patterns can be memorized and stitched in succession by functional pattern selecting operation. If another pattern is selected on stitching a succession of patterns, the micro-computer instantly enables comparison, discrimination, calculation of data and other necessary matters with respect to the newly selected pattern. Therefore, after the last needle position coordinate of the preceded pattern is detected, it is possible to instantaneously shift to the interconnecting pattern.

We claim:

1. A sewing machine memorizing by manipulation of pattern selecting switches a number of patterns including different patterns to be stitched in series, comprising means for producing directing signals to stitch the selected number of patterns in series; means for detecting the directing signals; means for identifying, in response to the directing signals, the last needle position coordinate of a precedingly stitched pattern and the initial needle position coordinate of the following pattern to be stitched; means for designating one of a plurality of previously memorized patterns to interconnect the precedingly stitched pattern and the following pattern in dependence upon the last and the initial needle position coordinates, respectively, of said precedingly stitched pattern and said following pattern; and means for interposing the designated interconnecting pattern between the precedingly stitched pattern and the following pattern.

2. A sewing machine as defined in claim 5, further comprising the signals to form the interconnecting pattern in dependence upon the last and initial needle position coordinates respectively of the two different patterns.

3. A sewing machine as defined in claim 2, wherein the calculation is based on a function of a combination of circular arcs of the same radius.

4. A sewing machine as defined in claim 2, wherein the calculation is based on a cubic curve having a cubic root.

* * * * *